UNITED STATES PATENT OFFICE.

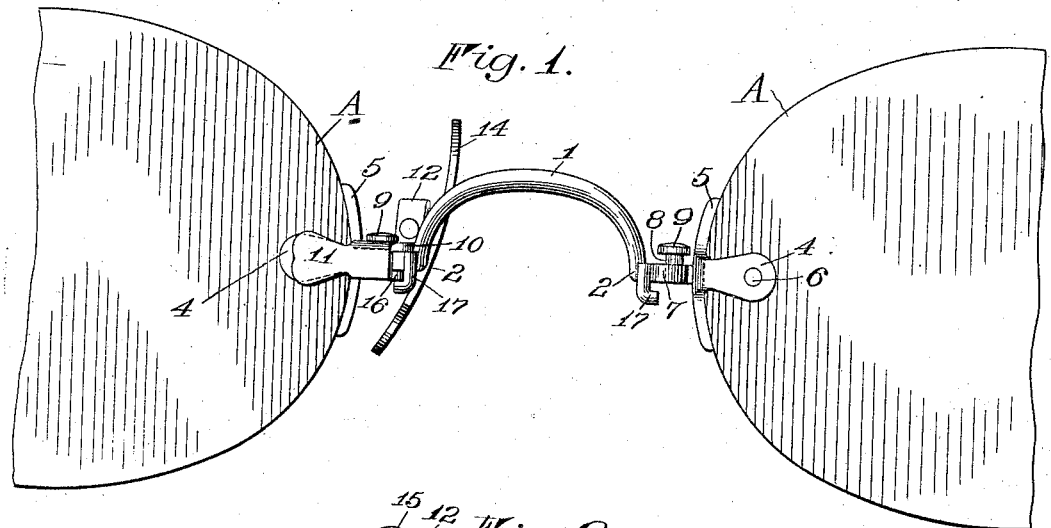
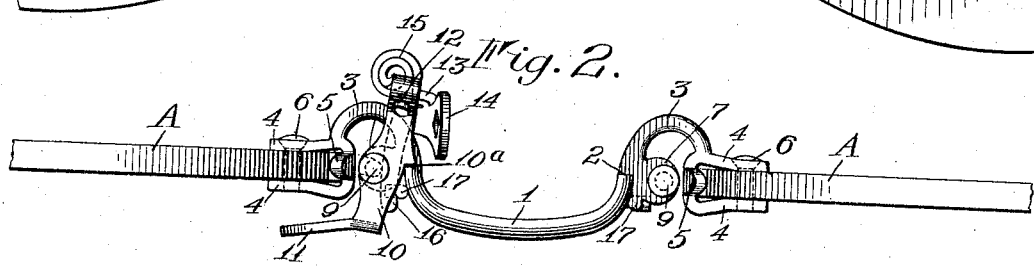
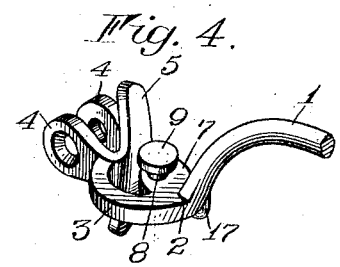
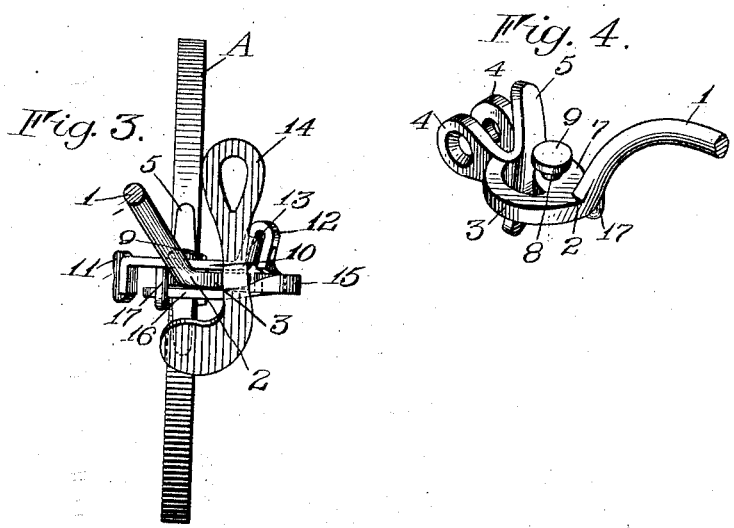

LEO F. ADT, OF ALBANY, NEW YORK.

EYEGLASS-MOUNTING.

1,040,098.     Specification of Letters Patent.     Patented Oct. 1, 1912.

Application filed April 7, 1909. Serial No. 488,412.

*To all whom it may concern:*

Be it known that I, LEO F. ADT, of Albany, in the county of Albany and State of New York, have invented certain new and useful Improvements in Eyeglass-Mountings; and I do hereby declare the following to be a full, clear, and exact description of the same, reference being had to the accompanying drawings, forming a part of this specification, and to the reference-numerals marked thereon.

The present invention relates to eyeglass mountings and it has for an object to make provision permitting the distance between the centers of the lenses to be adjusted and constructed and arranged so that a very small pupilary distance may be obtained.

To this and other ends the invention consists in certain improvements and combinations of parts all as will be hereinafter more fully described, the novel features being pointed out in the claims at the end of the specification.

In the drawings: Figure 1 is a front view of a mounting constructed in accordance with this invention with one of the nose guards removed; Fig. 2 is a top view of the same mounting with the same guard removed; Fig. 3 is a vertical central section through the mounting, and Fig. 4 is a detail perspective view of one end of the support.

In the embodiment herein shown the lenses A are connected by a support which may comprise a bridging or arched portion 1 having its ends 2 lying, in this instance, in the plane of the lenses. Connected to these ends 2 at points in vertical planes with said ends transverse to the plane of the lenses are adjustable or pliable portions 3 which, in this instance, are each in the form of a forwardly opening and horizontally arranged loop, the forward end of the inner arm of which merges into an end 2 of the bridging portion 1 and the forward end of the outer arm is secured to the rear or posterior portion of the lens attaching device which, in this instance, embodies parallel arms 4 connected by a lens bearing portion 5 and having the lenses A secured between the parallel portions by a screw or other fastener 6. The support also carries bearings for the nose guards and these bearings are preferably vertically arranged and located in vertical planes transverse to the plane of the lenses and between the arms of the loops 3 so that the distance between the ends 2 of the bridging portion and the lens attaching devices may be reduced to a minimum, and also that the mounting when viewed from the front will not be conspicuous. In the present instance the bridging portion has extended outwardly from the ends thereof between the arms of the loops, horizontal brackets or seats 7 carrying vertical bearings or pivot pins 8 preferably formed with heads 9 at their free ends. With this arrangement, the inner ends of the loops 3 connect with the bridging portion and the inner sides of the lens attaching devices and the loops are thereby hidden by the brackets 7.

Coöperating with the bearings 8 on the support are the nose guards which swing in a plane transverse to the plane of the lenses and may be of any suitable construction. Preferably each embodies a lever 10 mounted to swing over the loop by being provided with a vertical laterally opening bearing at a point between its ends to coöperate with a bearing 8 and having a finger piece or operating portion 11 at its forward end and a seat 12 in rear of its bearing for an arm 13 bent outwardly from the rear edge of the nose engaging member 14, which preferably has upper and lower nose engaging surfaces. The arms of each pliable loop 3 by lying in the same plane and in rear of the ends of the bridging portion provide surfaces which will coöperate with the guard levers and prevent the wabbling of the latter, while a stop or shoulder $10^a$ on the lever coöperates with the bridging portion to limit the inward movement of the nose engaging member 14.

The guards may be positioned in any suitable manner but it is preferred to employ a spring carried with each guard and comprising a true spiral coil 15 having its axis upright and located in rear of the pliable or adjustable loop 3, an arm 16 being extended forwardly from one end of the coil and coöperating with a depending hook or projection 17 on the support to position a guard and hold the laterally opening bearing thereof in engagement with the bearing 8. This arrangement permits the guard and the spring to be removed quickly for the purpose of repair, for adjusting the mounting to different noses, or for any other purpose.

To remove the mounting from the nose or place it upon the latter, the operating portions or finger pieces 11 are pressed together, thus separating the nose engaging members 14 and placing the springs under tension so that when the finger pieces 11 are released the springs move the nose engaging members 14 toward each other. For obtaining different pupilary distances the portions 3 are bent by pliers or by hand until the proper positions of the lenses are obtained.

Eyeglass mountings constructed in accordance with this invention in addition to permitting the adjustment for different pupilary distances, enable a minimum pupilary distance to be obtained as the pliable portions proceed directly from the ends of the bridging portion on the inner sides of the pivots so that the lens attaching devices may be adjusted very close to the pivots. Further the loops which effect this result are so located as to be inconspicuous when viewed from the front of the mounting.

I claim as my invention:

1. In an eyeglass mounting, a support for the lenses embodying a bridging portion having an end turned in a direction transversely of the plane of the lenses, an adjustable loop having one arm arranged in substantial alinement with the bridge end and connected thereto, a lens attaching device carried by the other arm of the loop and a nose guard bearing carried by the bridging portion and located between the vertical planes of the respective arms.

2. In an eyeglass mounting, a support for the lenses embodying a bridging portion, having an end turned in a direction transversely of the plane of the lenses, a pliable loop having one end arranged in substantial alinement with the bridge arm and connected thereto, a lens attaching device carried by the other arm of the pliable loop and a nose guard bearing carried by the bridging portion and located between the arms so that the lens attaching device is adjustable relatively thereto.

3. In an eyeglass mounting, the combination with a lens attaching portion and a forwardly opening pliable loop horizontally disposed having one arm connected to the lens attaching portion, of a forwardly inclined bridging portion having one end proceeding rearwardly transversely of the plane of the lenses in forward and rearward alinement with and joined integrally to the other arm of the pliable loop and a pivoted guard lever carried by the bridging portion and having its axis arranged outwardly laterally of the beforementioned alined parts of the bridging portion and loop.

4. In an eyeglass mounting, the combination of a support for the lenses embodying a bridging portion, pliable portions at the ends of the bridging portion, and lens attaching devices supported by the pliable portions, with swingingly mounted nose guards supported by the bridging portion beyond the inner ends of the pliable portions.

5. In an eyeglass mounting, a support for the lenses embodying a bridging portion provided with nose guard bearings beyond the ends thereof, pliable portions proceeding from the bridging portion on the inner sides of the bearings, and lens attaching devices supported by the pliable portions.

6. In an eyeglass mounting, the combination of a support for the lenses, embodying a bridging portion, a pliable loop arranged at one end of the bridging portion and a lens attaching device supported by the loop, with a swingingly mounted nose guard supported by the bridging portion in a vertical plane transverse of the plane of the lenses and between the arms of the loop.

7. In an eyeglass mounting, a support for the lenses, embodying a bridging portion, a horizontally arranged pliable loop at one end of the bridging portion, a lens attaching device supported by the loop, and a nose guard bearing supported by the bridging portion in a vertical plane transverse of the plane of the lenses and between the arms of the loop.

8. In an eyeglass mounting, the combination of a support for the lenses embodying a bridging portion, a horizontal seat supported from the bridging portion and having a vertical bearing, a pliable portion proceeding from the bridging portion on the inner side of the bearing, and a lens attaching device supported by the pliable portion, with a nose guard having a bearing to turn in engagement with the bearing on the support.

9. In an eyeglass mounting, a support for the lenses comprising a bridging portion, a horizontally arranged loop, the forward end of the inner arm of the loop being connected to an end of the bridging portion, a vertical bearing for a nose guard supported in a vertical plane transverse of the plane of the lenses and between the arms of the loop, and a lens attaching device carried by the forward end of the outer arm of the loop.

10. In an eyeglass mounting, the combination of a support for the lenses embodying a bridging portion and a forwardly opening and horizontally arranged loop at the end of the bridging portion, with a nose guard supported by the bridging portion and mounted to swing in a horizontal plane to one side of the horizontal plane of the loop.

11. In an eyeglass mounting, the combination of a support for the lenses embodying a bridging portion and a forwardly opening and horizontally arranged loop at the end of the bridging portion, with a nose guard supported by the bridging portion and mounted to swing across and over the loop.

12. The combination with a support comprising a bridging portion, a horizontal seat at an end of the bridging portion, a lens attaching device and a pliable loop supporting the lens attaching device from the bridging portion, said loop permitting the adjustment of the lens attaching device relatively to the bridging portion and to the seat, of a guard embodying a lever arranged above the support and turning on the seat.

13. The combination with a support for the lenses comprising a bridging portion, a lens attaching device, and a pliable connecting portion, of a nose guard pivoted to the bridging portion about an axis directly in front of the pliable portion.

14. The combination with a support for the lenses comprising a bridging portion, a lens attaching device, and a pliable connecting portion, of a nose guard carried by the bridging portion so that the lens attaching device is adjustable relatively thereto and having an arm carrying a nose engaging member and mounted to swing in a horizontal plane to one side of the horizontal plane of the pliable portion.

15. The combination with a support for the lenses comprising a bridging portion, a lens attaching device and a pliable portion connecting the lens attaching device with the bridging portion, of a nose guard carried by the bridging portion so that the lens attaching device is adjustable relatively thereto and having an arm carrying a nose engaging member and mounted to swing in a horizontal plane to one side of the horizontal plane of the pliable portion.

LEO F. ADT.

Witnesses:
RUSSELL B. GRIFFITH,
HAROLD H. SIMMS.

Copies of this patent may be obtained for five cents each, by addressing the "Commissioner of Patents, Washington, D. C."